United States Patent [19]

Rothenberg et al.

[11] 4,061,703

[45] Dec. 6, 1977

[54] METHOD OF PATCHING VOIDS IN A SEMI-CONDUCTIVE COMPONENT OF INSULATED ELECTRIC CABLE, AND COMPOUND THEREFOR

[75] Inventors: Sidney Rothenberg, Fairfield; Joseph Edward Vostovich, Bridgeport, both of Conn.

[73] Assignee: General Electric Company, New York, N.Y.

[21] Appl. No.: 470,399

[22] Filed: May 16, 1974

[51] Int. Cl.[2] .......... B29H 5/01

[52] U.S. Cl. .......... 264/36; 156/48; 260/42.41; 264/105; 264/174; 264/236; 526/228

[58] Field of Search .......... 264/36, 105, 236, 347, 264/174; 260/42.41, 42.42, 94.9 GA; 156/48; 526/228

[56] References Cited

U.S. PATENT DOCUMENTS

| | | | |
|---|---|---|---|
| 2,534,078 | 12/1950 | Strain | 260/94.9 GA |
| 2,888,424 | 5/1959 | Precopio et al. | 260/42.42 |
| 3,201,503 | 8/1965 | Benning et al. | 264/95 |
| 3,661,877 | 5/1972 | Bluestein et al. | 260/87.3 |
| 3,793,476 | 2/1974 | Misiura et al. | 174/120 R |

*Primary Examiner*—Jeffery R. Thurlow
*Attorney, Agent, or Firm*—R. G. Simkins; P. L. Schlamp; F. L. Neuhauser

[57] ABSTRACT

The mending of defective semiconductive components of insulated electrical cable, comprising filling and sealing voids or breaks within a body of semiconductive material with a curable semiconductive patching compound comprising the combination of chlorosulfonated polyethylene, conductive filler and lauroyl peroxide, and heating the patching compound to cure the same.

15 Claims, No Drawings

METHOD OF PATCHING VOIDS IN A SEMI-CONDUCTIVE COMPONENT OF INSULATED ELECTRIC CABLE, AND COMPOUND THEREFOR

BACKGROUND OF THE INVENTION

Electrical power cables are frequently constructed with a composite insulating covering of a plurality of layers or units. For example, power cables of medium-to-high voltage capacity, such as 15KV and higher, are commonly provided with one or more bodies of shielding semiconductive material adjacent to the body of the primary dielectric insulation as is illustrated in U.S. Pat. Nos. 3,096,210; 3,259,688; 3,287,489; 3,482,033; 3,541,228; 3,569,610, and many other patents.

However, in such high voltage carrying cables, the presence of flaws in the covering body enclosing the conductor, such as air spaces, pores or voids, cause faults which result in failure of the insulation and in turn the cable. The magnitude of this problem of voids or breaks in cable insulating coverings is indicated by many recent U.S. patents comprising U.S. Pat. Nos. 3,527,874; 3,629,110; 3,646,248; 3,666,874; and 3,793,476.

The occurrence of flaws such as voids or breaks in semiconducting polymeric materials or shields overlying the primary body of dielectric insulation of electric cables, due, for example, to problems with the stock material, production processes such as extrusion, or whatever cause, constitutes a significant and costly defect in cable products, often necessitating the cutting out of sections of expensive high voltage cables to remove defective portions therefrom.

Remedial efforts to patch such faults in multilayered cable constructions comprising cured or thermoset polymeric dielectric insulations and/or semiconductive shields with a material of the same or similar composition as that containing the defect have encountered serious problems. The subsequent curing of the applied patching material by the usual heat curing systems and means has generally caused a separation of the layers of material adjacent to the patched area, and/or the development of internal pores in the material adjacent to the patched area constituting new voids or faults which likewise degrade the electrical properties of the cable and its performance life.

SUMMARY OF THE INVENTION

This invention comprises a method of mending flaws comprising voids or breaks in cured or curable semiconductive polymeric components in insulated electrical cable, and a patching compound therefor, which effectively remedies the faults therein and their potential for failure and electrical breakdown, and thereby salvages otherwise defective cable products.

The method of this invention comprises applying a curable compound of a specific combination of ingredients, to the fault or break, filling the void or opening resulting therefrom, and thereafter curing the applied patch to induce therein a theremoset condition coextensive with material being patched and to fuse and integrate the mass of the patch with its surroundings.

OBJECTS OF THE INVENTION

It is a primary object of this invention to provide a method of patching faults or voids in thermosetting semiconductive polymeric compounds or components in insulated electrical cables which salvages the defective portions of such products and avoids the need for their removal.

It is also a primary object of this invention to provide a method of mending defects in insulated electrical cable constructions comprising multiple layers, which does not cause a separation of the layers from each other or the development of pores, new voids or other irregularities in the materials being patched or in the layers or components adjacent or near thereto.

It is a further object of this invention to provide a method of patching, and a heat-curable patching compound, which upon application and curing substantially corresponds or duplicates the electrical and thermal properties of the surrounding component or material.

DESCRIPTION OF A PREFERRED EMBODIMENT

Although the means of this invention have broader application, the invention is specifically directed to the patching of the semiconductive components in insulated electrical conductors such as described and illustrated in U.S. Pat. Nos. 3,793,476; 3,541,228; and 3,677,849, and related patents.

The presence of voids or breaks in electrical conductor coverings or insulations, as noted in U.S. Pat. No. 3,793,476 and elsewhere in the art, is especially detrimental in the higher-voltage-carrying cables whether due to interfacial spaces between components or layers of materials, or the occurrence of pores or openings resulting from gases, non-uniform stock material or the extrusion thereof, or subsequent ruptures or separations of the mass of a body caused by physical stresses or forces. This invention is primarily concerned with effectively and economically remedying voids or breaks in the body of semiconductive components of an insulated electrical cable regardless of their cause or source.

The unique and advantageous method of mending faults in semiconductive components of this invention comprises applying a novel combination of materials constituting a curable semiconductive polymeric compound to the void or opening constituting the fault and filling the same, and thereafter curing said polymeric compound under conditions which are not detrimental to the material being patched or areas adjacent thereto. The application of the curable polymeric patching compound may also entail a cutting away or "cleaning" of material about the void or rupture to remove loose or irregular material and to provide a cavity of apt depth and configuration to more effectively embrace and retain a filling mass of the patch compound within its confines.

The curable patching composition for the practice of this invention comprises a combination of chlorosulfonated polyethylene, or blends of a major portion of at least about 65% by weight of chlorosulfonated polyethylene with up to about 45% by weight of ethylene-propylene rubber, conductive filler material, lauroyl peroxide, and preferably a coagent.

The ethylene-propylene rubber component includes either copolymers of ethylene and propylene, or terpolymers of ethylene and propylene with minor proportions of dienes such as ethylidiene norbornene, dicyclopentadiene or 1,4-hexadiene, and combinations of such copolymers and terpolymers.

Conductive filler material comprises electrical conductivity imparting agents such as carbon black or metal particles which can be included in amounts of about 15 to about 100 parts by weight per 100 parts of the polymeric material, and typically about 50 to about 100 parts by weight thereof. The proportions of conductive filler material can be adjusted effectively to provide approximately the same degree of electrical resistance in the patching compound as the material being mended therewith.

The lauroyl peroxide agent is combined with semiconductive polymeric compound in amounts effectively to provide the degree of cross-link curing to produce a thermoset product of the desired extent of insolubility and resistance to heat. Typical amounts comprise about 2 to about 8 parts of lauroyl peroxide, with about 5 parts by weight of the curable polymeric material being suitable for most services.

The inclusion of a coagent in the curable patching compound of this invention is highly preferred to augment the crosslinking curing of the peroxide cure system. Typical coagents for the practice of the invention comprise trimethylol propane trimethacrylate (Sartomer SR-350), ethylene glycol dimethacrylate (Sartomer SR-206), 1,3-butylene glycol dimethacrylate (Sartomer SR-297), dinitrosobenzene, diphenyl guanidiene, triallyl cyanurate, and diallyl phthalate. Coagents are preferably included in amounts of up to about 5 parts by weight per 100 parts of curable polymeric material to enhance the cross-linking cure with a free radical system, and typically are included in amounts of about 0.5 to about 2 parts by weight.

The curable semiconductive polymeric patching compounds preferably also include other common compounding agents, such as antioxidants, stabilizers, plasticizers, lubricants and the like expedient ingredients which enhance the service life or other properties of the compounds.

Curing of the heat-curable semiconductive patching compound in carrying out the advantageous method of this invention, is preferably effected at relatively low temperatures whereby the material comprising the fault being mended and the area adjacent thereto is not degraded, or rendered porous or separated from adjacent components. Temperatures of just above the 200° F to 225° F decomposition level of the lauroyl peroxide are generally adequate, for example about 200 up to about 250° F, are preferred, although higher temperatures can be applied if significant deterioration or detrimental effects are not encountered. Heating should be carried out until the mass is brought up to the desired level to achieve the designed cure, and in most cases exposure to curing temperatures for up to about 20 to about 60 minutes will suffice to reach curing levels throughout typical products.

The following comprise specific examples of the patching method, and curable semiconductive polymeric compounds therefor, of this invention and their relevant properties. In the examples the relative proportions of the ingredients are given in parts by weight, and each composition was cured for 30 minutes at 250° F.

| Ingredients | EXAMPLES I | II | III |
|---|---|---|---|
| Chlorosulfonated polyethylene duPont's Hypalon LD-999 | 82.5 | 82.5 | 100.0 |
| Ethylene-propylene terpolymer duPont's Nordel 1320 | 17.5 | 17.5 | — |
| Conductive carbon black Vulcan XC-72 | 65.0 | 65.0 | 71.0 |
| Hydrocarbon oil Circosol 4240 | 20.0 | 20.0 | 20.0 |

-continued

| Ingredients | EXAMPLES I | II | III |
|---|---|---|---|
| Fumed litharge, TLD-90 90% PbO in EPDM | 20.0 | 20.0 | 20.0 |
| Crystalline hydrocarbon wax Sunoco Anti-Chek | 2.0 | 2.0 | 2.0 |
| Antioxidant-nickel dibutyl dithiocarbamate | 1.5 | 3.0 | 3.0 |
| Antioxidant-Agerite Resin D 1,2 dihydro-2,2,4-trimethylquinoline | 0.25 | 0.5 | 0.5 |
| Coagent-Sartomer SR 350 trimethylol propane trimethacrylate | 2.0 | 2.0 | 2.0 |
| Lauroyl Peroxide | 5.0 | 5.0 | 5.0 |

Following compounding and curing at 250° F for 30 minutes, the composition properties were:

| | Properties | | | Insulated Power Cable Engineers Association Requirements |
|---|---|---|---|---|
| Original Tensile, lbs. | 1734 | 1600 | 2046 | |
| Elong., % | 145 | 170 | 240 | |
| 121° C Oven-7 Days | | | | |
| Tensile, lbs./in.$^2$ | 1800 | 1830 | 2180 | |
| Elong., % | 105 | 116 | 167 | 100% minimum (absolute elongation) |
| Volume Resistivity ohm-cm | | | | |
| Room Temp. | 288 | 438 | 665 | 5000 maximum |
| 90° C | 570 | 373 | 283 | 50,000 maximum |

Curable compounds of each of the compositions of Examples I, II and III were used to patch faults comprising voids in the overlying semiconductive layer of sample sections of semiconductive shield, medium voltage 15KV power cable described in U.S. Pat. No. 3,793,476, having a semiconductive shield of the cured composition of Example VI given therein, and comprising the following:

| | Parts By Weight |
|---|---|
| Chlorosulfonated polyethylene duPont Hypalon 40S | 65 |
| Ethylene propylene terpolymer duPont Nordel 1320 | 35 |
| Conductive carbon black Vulcan XC-72 | 45 |
| Hydrocarbon oil Circosol 4240 oil | 17 |
| Fumed litharge - TLD-90 (90% litharge in EPDM) | 20 |
| Crystalline hydrocarbon wax Sunoco Anti-Chek | 2 |
| Antioxidant-Agerite Resin D polymerized 1,2-dihydro 2,2,4-trimethylquinoline | 0.5 |
| Trimethylol propane trimethylacrylate SR-350 | 2 |
| Di-α-cumyl peroxide curing agent (Hercules Di-Cup T) | 2.64 |

Prior to applying the curable patching compounds of the Examples, the area about the faults in the semiconductive layer of the cable sections was checked and trimmed to remove any loose or irregular material and to provide a cavity of apt depth and configuration to embrace the patching material, and the adjacent area was lightly sanded to provide a clean receptive surface. The patching compounds of the Examples were then individually applied to voids within the semiconductive layer of the cable sample sections and compacted to effectively fill the cavities, and cured in situ by heating the patched sections of the cable to 250° F for 30 minutes. The foregoing cured patching compounds were evaluated for volume resistivity, and the strippability of cured cable patches for the formulation of Examples II and III were tested for peeling force in pounds according to the test conditions given in U.S. Pat. No. 3,793,476. The results of these tests were as follows:

| | EXAMPLES | | |
|---|---|---|---|
| | I | II | III |
| Volume Resistivity ohm-cm | | | |
| Room Temperature | 288 | 113 | 183 |
| 90° C | 570 | 113 | 161 |
| Strippability, Peel Test, lbs. pull | | | |
| 1st patch | — | 6.0 - 4.5 | 5.75 - 5.0 |
| 2nd patch | — | 5.5 - 3.75 | 4.5 - 3.0 |

Although the invention has been described with reference to certain specific embodiments thereof, numerous modifications are possible and it is desired to cover all modifications falling within the spirit and scope of the invention.

What we claim as new and desire to secure by Letters Patent of the United States is:

1. A method of patching voids in a body of a semiconductive component of an insulated electrical cable, comprising the steps of filling a void in a semiconductive body with a curable semiconductive polymeric compound consisting essentially of chlorosulfonated polyethylene, conductive filler material, and lauroyl peroxide in an amount of about 2 to about 8 parts by weight per 100 parts by weight of the chlorosulfonated polyethylene, and heating the curable semiconductive polymeric composition to a temperature of at least about 200° F.

2. The method of claim 1, wherein the curable semiconductive polymeric compound is heated to a temperature of at least about 200° F for a period of at least about 60 minutes.

3. The method of claim 1, wherein the curable semiconductive polymeric compound comprises a coagent.

4. The method of claim 1, wherein the curable semiconductive polymeric compound is heated to a temperature of approximately 250° F for a period of about 30 to about 60 minutes.

5. A method of patching voids in a body of a semiconductive component of an insulated electrical cable, comprising the steps of filling a void in a semiconductive body with a curable semiconductive polymeric compound consisting essentially of a blend containing ethylene-propylene rubber and at least about 65% by weight of the polymeric contents of chlorosulfonated polyethylene, conductive filler material, and lauroyl peroxide in an amount of about 2 to about 8 parts by weight per 100 parts by weight of the blend of ethylene-propylene rubber and chlorosulfonated polyethylene, and heating the curable semiconductive polymeric composition to a temperature of at least about 200° F.

6. The method of claim 5, wherein the curable semiconductive polymeric compound is heated to a temperature of at least about 200° F for a period of at least about 60 minutes.

7. The method of claim 5, wherein the curable semiconductive polymeric compound comprises a free radical crosslink cure enhancing coagent.

8. The method of claim 5, wherein the curable semiconductive polymeric compound is heated to a temperature of approximately 250° F for a period of about 30 to about 60 minutes.

9. A method of patching voids in a body of a semiconductive component of an insulated electrical cable, comprising the steps of filling a void in a semiconductive body with a curable semiconductive polymeric compound comprising at least about 75% to about 100% by weight of the polymeric material of chlorosulfonated polyethylene and 0 to about 25% by weight of the polymeric material of ethylene-propylene rubber, conductive carbon black filler, and about 2 to about 8 parts by weight of lauroyl peroxide per 100 parts by weight of said polymeric material, and heating the curable semiconductive polymeric compound to a temperature of at least about 200° F for a period of at least about 20 minutes.

10. The method of claim 9, wherein the curable semiconductive polymeric compound is heated to a temperature of approximately 250° F for a period of about 30 to about 60 minutes.

11. A method of patching voids in a body of semiconductive component of an insulated electrical cable, comprising the steps of filling a void in a semiconductive body with a curable semiconductive polymeric compound comprising about 75 to 100 parts by weight of chlorosulfonated polyethylene, 0 to about 25 parts by weight of ethylene-propylene rubber, about 15 to about 100 parts by weight of conductive carbon black filler, and a curing agent consisting essentially of about 2 to about 8 parts by weight of lauroyl peroxide, and heating the curable semiconductive polymeric compound to a temperature of at least about 200° F for a period of at least about 30 minutes.

12. The method of claim 11, wherein the curable semiconductive polymeric compound is heated to a temperature of approximately 250° F for a period of about 30 to about 60 minutes.

13. The method of claim 11, wherein the curable semiconductive polymeric compound comprises a free radical crosslink cure enhancing coagent in amount of up to about 5 parts by weight per 100 parts by weight of curable polymeric material.

14. A method of patching voids in a body of a semiconductive component of an insulated electrical cable, comprising the steps of filling a void in a semiconductive body with a curable semiconductive polymeric compound consisting essentially of about 75 to 100 parts by weight of chlorosulfonated polyethylene 0 to about 25 parts by weight of ethylene-propylene rubber, about 15 to about 100 parts by weight of conductive filler, about 0.5 to about 5 parts by weight of a curing coagent, and about 2 to about 8 parts by weight of lauroyl peroxide and heating the curable semiconductive polymeric compound to a temperature of at least about 200° F up to about 250° F for a period of at least about 20 minutes.

15. A method of patching voids in a body of a semiconductive compound of an insulating electrical cable, comprising the steps of filling a void in a semiconductive body with a curable semiconductive polymeric compound consisting essentially of about 75 to 100 parts by weight chlorosulfonated polyethylene, 0 to about 25 parts by weight of ethylene-propylene rubber, about 50 to about 100 parts by weight of conductive carbon black, about 2 to about 8 parts by weight of lauroyl peroxide, about 0.5 to about 5 parts by weight of a curing coagent, hydrocarbon oil, litharge, hydrocarbon wax, and antioxidant, and heating the curable semiconductive polymeric compound to a temperature of at least about 200° F up to about 250° F for a period of about 30 to about 60 minutes.

* * * * *